United States Patent [19]

Spani

[11] Patent Number: 4,703,314
[45] Date of Patent: Oct. 27, 1987

[54] EMPTY CONTAINER DETECTOR WITH DROP SENSOR

[75] Inventor: Wayne M. Spani, San Diego, Calif.

[73] Assignee: Fisher Scientific Group, Inc., La Jolla, Calif.

[21] Appl. No.: 938,029

[22] Filed: Dec. 4, 1986

Related U.S. Application Data

[63] Continuation of Ser. No. 834,698, Feb. 27, 1986, Pat. No. 466,391.
[51] Int. Cl.$^4$ ............................................. G01F 23/28
[52] U.S. Cl. ....................................... 340/619; 73/293; 250/577
[58] Field of Search ................... 340/619; 73/293; 250/577, 573, 357.1

[56] References Cited

U.S. PATENT DOCUMENTS

| | | |
|---|---|---|
| 2,835,252 | 5/1958 | Mauchel. |
| 3,636,360 | 1/1972 | Oishi et al. ........................... 250/577 |
| 4,114,144 | 9/1978 | Hyman .................................. 340/632 |
| 4,244,365 | 1/1981 | McGill et al. . |
| 4,312,341 | 1/1982 | Zissimopoulos et al. . |
| 4,344,429 | 8/1982 | Cupton et al. . |
| 4,366,384 | 12/1982 | Jensen .................................. 250/575 |
| 4,367,736 | 1/1983 | Gupton . |

FOREIGN PATENT DOCUMENTS

| | | |
|---|---|---|
| 2406640 | 8/1975 | Fed. Rep. of Germany ........ 73/293 |
| 2437798 | 2/1976 | Fed. Rep. of Germany ........ 73/293 |
| 2855651 | 6/1980 | Fed. Rep. of Germany ........ 73/293 |
| 1417111 | 12/1975 | United Kingdom ................ 340/619 |

OTHER PUBLICATIONS

"Circuit Optimizes Optical-Switch Biasing", by Wayne M. Spani, EDN Sep. 20, 1979.

Primary Examiner—Stewart J. Levy
Assistant Examiner—Joseph W. Roskos
Attorney, Agent, or Firm—Workman, Nydegger & Jensen

[57] ABSTRACT

An empty container detector for use with a drip chamber comprises a photoelectric transducer associated with the fluid container which generates a variable control signal to alternately indicate whether the light path of the photoelectric transducer is being refracted by a fluid. A second photoelectric transducer is associated with a fluid container above the fluid level in the container to establish a reference signal which is modulated by drops falling into the container and which has a component corresponding to the condition wherein the light path is not refracted or attenuated by the presence of a fluid. Electrical means are provided to connect the first photoelectric transducer to the second photoelectric transducer to linearize and normalize the reference signal with the control signal. A comparator is associated with the photoelectronic transducers and connected to an alarm which indicates when the control signal is substantially equivalent to the reference signal and thus indicating the lowering of the fluid level below the light pathof the first photoelectric transducer. Another comparator is associated with the photoelectric transducers to count modulations in the reference signal as indicative of the drops entering the container.

16 Claims, 8 Drawing Figures

EMPTY CONTAINER DETECTOR WITH DROP SENSOR

BACKGROUND OF THE INVENTION

This is a continuation-in-part of U.S. application Ser. No. 834,698 filed on Feb. 27, 1986, now U.S. Pat. No. 4,665,391.

This invention relates generally to fluid level detectors having an associated drop sensor. More particularly, this invention relates to a fluid level detector which can be associated with a fluid container to indicate when the container is empty of fluid. Additionally, the fluid level detector of the present invention incorporates an apparatus which senses the flow of fluid into the container. The present invention is particularly, but not exclusively, useful in the health care field for detecting the completion of fluid infusion by monitoring the fluid level of a drip chamber associated with the fluid source.

DESCRIPTION OF THE PRIOR ART

In the medical device field, the possibility of air entering an IV administration set is a major concern. Accordingly, attempts have been made to determine when air is present in the IV line between the fluid source and the patient and many devices have been proposed for this purpose. For example, U.S. Pat. No. 4,114,144 to Hyman, which is assigned to the same assignee as the present invention, discloses one of several types of air-in-line detectors which employ optical circuits. In their operation, such air-in-line detectors typically rely on the physical properties of fluids present in the IV tube to refract a light beam. They make use of the reflective properties of fluids for directing a light beam onto or away from a photoelectric sensor and use the consequent sensor signal to indicate the presence or absence of a fluid. In a refinement of this technology, an air-in-line detector as disclosed in Application Ser. No. 716,862 to Meijer and assigned to the same assignee as the present invention additionally negates the attenuating properties of varying fluid opacities by using different light intensity thresholds for the incorporated sensors.

Impliedly, air-in-line detectors are exclusively concerned with the detection of air bubbles in the IV line itself. It makes no difference how the air enters the line. In addition to the beneficial attributes of an air-in-line detector, there are situations involving medical devices, i.e., controllers and/or pumps, when it is desirable to cease the operation of the medical device upon the depletion of fluid from the fluid source. And this may be so even though there is not air in the IV line. Accordingly, the ability to determine when the fluid source is depleted has several advantages. First, if the depletion of the fluid source can be detected, the medical device can be stopped before air is brought into the operating system of the medical device and into the IV infusion tube. Second, the ability to stop the operation of the medical device before air enters the system allows for rapid replacement of the fluid source with no need to reprime the medical device. Additionally, the empty container detector envisioned by the present invention is placed in fluid communication with the fluid source and is not an integral part of the medical device. Thus, it has flexibility and can be associated with the fluid source of various medical devices regardless of the particular type or construction of the medical device.

Efficiency and cost effectiveness dictate that several functions be accomplished by a single IV administration set whenever practical. In IV infusion therapy it is important to know when fluid in the set has been depleted and to also know whether fluid is flowing in the set. Thus, a device which performs both functions is desirable. Typically, the determination of whether fluid is flowing in an IV set is accomplished by observing the flow of drops through a drip chamber. This task has been done visually for many years. Recently, electronic devices to perform this same function have also been proposed. For example, U.S. Pat. No. 4,346,606 to Cannon et al. discloses a battery operable drop rate counter which senses successive drops of fluid entering a drip chamber. No single device, however, has been proposed which combines the drop sensing function with the fluid depletion detection function as proposed by the present invention.

In light of the foregoing, the present invention recognizes that there is a need for a detector which is capable of direct association with the fluid source and which is able to provide accurate information concerning the presence or absence of fluid in the container. Accordingly, it is an object of the present invention to provide an empty container detector which will provide accurate information on the fluid level in a fluid container. It is another object of the present invention to compare a control signal with a normalized reference signal which is independent of the material used for construction of the fluid container so long as the container is transparent to light. Still another object of the present invention is to provide a detector which is effective for determining fluid level in a fluid container regardless of whether the fluid is transparent, opalescent or opaque. It is still another object of the present invention to provide an empty container detector having an incorporated drop sensor for determining the rate at which fluid flows into the container. Yet another object of the invention is to provide an easily manufacturable, cost effective and easy to use empty container detector which is easily adaptable for use in a multitude of medical environments.

SUMMARY OF THE INVENTION

A preferred embodiment of the novel empty container detector includes a photoelectric transducer which is normally associated with a transparent fluid container below the fluid level in the container to generate a variable control signal. As envisioned by the present invention, the control signal is variable between a first state wherein fluid is detected and a second state wherein an absence of fluid is indicated. The empty container detector of the present invention further comprises another photoelectric transducer which is associated with the container above the fluid level in the container to establish a reference signal. This reference signal, which is the output of the upper photoelectric transducer, corresponds to an actual no-fluid-in-container condition. Further, this reference signal is provided as input to the lower photoelectric transducer. Thus, electrical connecting means are incorporated to normalize and linearize the control signal relative to the reference signal. A comparator means is provided for the present invention to alarm and indicate an empty container condition whenever the normalized control signal is substantially equivalent to the reference signal.

Stated differently, the detector of the present invention indicates an empty container whenever the control signal is in the second state and the second state is substantially equivalent to the reference signal.

The preferred embodiment of the novel empty container detector of the present invention incorporates a drop sensor which is able to sense successive drops of fluid entering the container. Specifically, the upper photoelectric transducer is positioned so its light beam is intersected and modulated by drops falling into the container. A first electrical means disregards the modulations caused by the falling drops and provides the normalized input for the lower photoelectric transducer. A second electrical means counts the interruptions in the circuitry of the upper photoelectric means to indicate the rate of flow of fluid into the container.

The novel features of this invention as well as the invention itself, both as to its structure and operation, will be best understood from the accompanying drawings taken in conjunction with the accompanying description in which similar reference characters refer to simliar parts and in which:

DESCRIPTION OF THE PREFERRED EMBODIMENT

Figure 1:
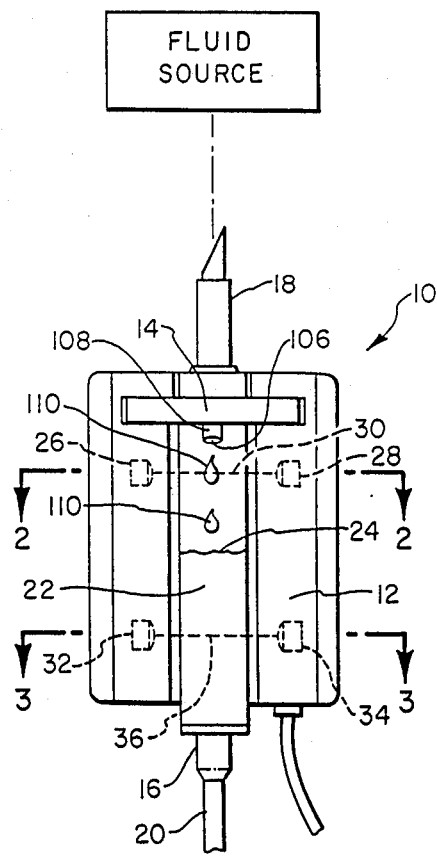
FIG. 1 is an elevational view of the empty container detector in association with a drip chamber.

Referring to FIG. 1, the empty container detector of the present invention is shown and is generally designated as 10. More particularly, it is seen in FIG. 1 that the empty container detector 10 includes a casing 12 which is operatively associated in partial surrounding relationship with a drip chamber 14. As is well known to those skilled in the pertinent art, drip chamber 14 typically comprises a container 16 which is made from a clear resilient plastic material that allows pinching or squeezing of the container 16. Further, drip chamber 14 includes a standard type spike 18 which is associatable or connectable with a fluid source (not shown). Typically, drip chamber 14 is placed in fluid communication with a fluid source by the insertion of spike 18 into a stopple (not shown) or septum (not shown) which is associated with the fluid source. As also seen in FIG. 1, the drip chamber 14 has an associated tubing 20 which connects the drip chamber 14 into fluid communication with a medical device (not shown) or some other form of apparatus used to control the infusion to a patient of fluids which are passing through drip chamber 14.

Drip chamber 14 also includes an input orifice 106 through which fluid from the fluid source (not shown) flows into drip chamber 14. As is well known in the pertinent art, input orifice 106 is associated with a drop former 108 which causes fluid entering drip chamber 14 to be ordered into a stream of successive drops 110.

In an operable state, drip chamber 14 is partially filled with fluid 22 to establish a fluid level 24 somewhere near the midpoint of container 16. As seen in FIG. 1, the empty container detector 10 is associated with drip chamber 14 in a manner to place a photoelectric transducer above fluid level 24 and another photoelectric transducer below fluid lever 24. More specifically, as shown in phantom in FIG. 1, a photoelectric detector comprises an emitter (diode) 26 optically associated with a sensor (transistor) 28. As will be more apparent after further disclosure of the present invention, the emitter 26 and sensor 28 provide a photoelectric circuit which includes a light path 30 between emitter 26 and sensor 28.

As mentioned above, the circuitry created by emitter 26 and sensor 28 are disposed relative to drip chamber 14 so that light path 30 is above fluid level 24. As also seen in FIG. 1, empty container detector 10 further comprises an emitter (diode) 32 optically associated with a sensor (transistor) 34 to establish circuitry which includes a light path 36. Further, in accordance witht he present invention, the circuitry created by emitter 32 and sensor 34 is positioned relative to drip chamber 14 so that when drip chamber 14 is normally operative, i.e., there is fluid in conatiner 16, light path 36 passes through fluid 22 at a point below fluid level 24. Further, as shown in FIG. 1, the light paths 30 and 36 are arranged so that they are substantially parallel to each other.

Figure 2:
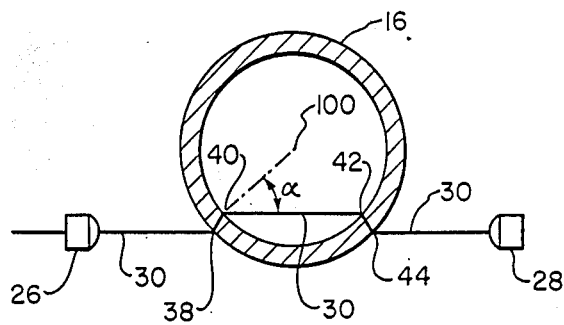
FIG. 2 is a cross-sectional view of the empty container detector and associated drip chamber as seen along the line 2—2 in FIG. 1 with some parts removed for clarity.

The actual operation of emitter 26 and sensor 28 circuitry will be best understood by reference to FIG. 2 where it is seen that emitter 26 and sensor 28 are positioned relative to drip chamber 14 such that their alignment is offset from the longitudinal axis of drip chamber 14. Thus, it will be appreciated by the skilled artisan that light from emitter 26 when incident upon container 16 at the point 38 at any angle $\alpha$ to the normal 100 will be refracted by the container 16. Further, upon emergence of the light from container 16 into the air above fluid level 24 in container 16 at the point 40, light path 30 will again be refracted. This time the light is refracted so that the portion of path 30 between points 40 and 42 is substantially parallel to the path 30 between emitter 26 and point 38. Subsequently, the incidence of light at point 42 and its emergence at point 44 causes a further refraction of light path 30 that brings the light into alignment as an extension of the origin path 30 and directs the light onto sensor 28. Recognize that the above described light path 30 results only when light path 30 passes through air in container 16 above fluid level 24. When a medium in container 16, other than air, lies between emitter 26 and sensor 28, the resultant light path will be substantially altered.

Figure 3:
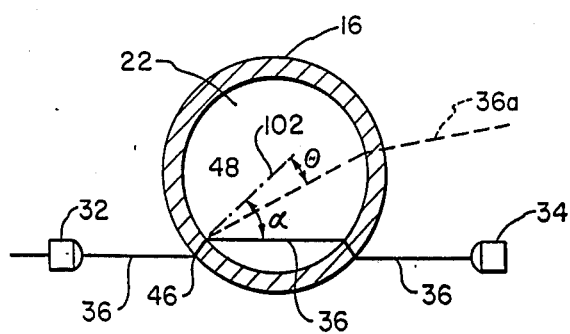
FIG. 3 is a cross-sectional view of the empty container detector and associated drip chamber as seen along the line 3—3 in FIG. 1 with some parts removed for clarity.
Figure 6:
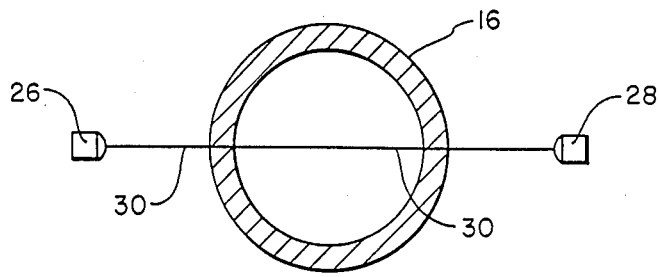
FIG. 6 is a cross-sectional view of the empty container detector and associated drip chamber with some parts removed for clarity as seen along the line 2—2 in FIG. 1, when the detector performs a drop sensor function.

A specific arrangement for the photoelectric detector comprising emitter 26 and sensor 28 occurs when the emitter 26 and sensor 28 are diametrically opposed to each other relative to the container 16, as shown in FIG. 6. This arrangement positions light path 30 substantially perpendicular to the longitudinal axis of container 16 and accomplishes several objectives. Firstly, since light path 30 is normal to the surfaces of container 16 at its points of incidence and emergence, light path 30 will be unrefracted. This fact, however, does not in any way hinder the function of this upper photoelectric detector to provide a normalized input for a lower photoelectric detector. This function, and the associated electrical circuitry will be subsequently discussed in detail. Secondly, since light path 30 now passes generally through the center of container 16, path 30 is properly positioned to be broken or interrupted by drops 101 falling from drop former 108 into the container 16. The proper positioning of light path 30 with respect to drop former 108 is important to insure that a drop 110 has in fact been formed before it interrupts light path 30. This can be easily accomplished by providing sufficient distance between drop former 108 and light path 30 to accomplish this purpose. The skilled artesan will recognize that an operational interaction of light path 30 with any container can be accomplished even where the container is not cylindrically shaped. Thus, in connection with electrical circuitry to be subsequently discussed in detail, sensor 28 can be used to detect the passage of drops 110 through light path 30 as well as cooperate with other components to determine when container 16 is emptied of fluid.

Where a medium, such as a fluid, is held in container 16, the light path will be similar to that shown in FIG. 3. In this case, although container 16 refracts light through the angle α, light is refracted from the normal 102 by an angle θ after entering the fluid in container 16. The light then continues along light path 36a and exits container 16, as shown in FIG. 3, without being incident upon sensor 34. This, of course, occurs so long as the fluid in container 16 allows for the passage of light. If the fluid in container 16 is opaque or sufficiently opalescent, the light will be attenuated instead of refracted. In either case, light will not be incident on sensor 34. Thus, regardless of the nature of the fluid, its mere presence will be sufficient to affect the incidence of light on sensor 34. Accordingly to the present invention, however, if the fluid lever 24 in drip chamber 14 falls below the light path 36 as indicated in FIG. 1, the light is no longer either refracted or effectively attenuated and, instead, is subjected to the same physical properties during its passage between emitter 32 and sensor 34 as is the light in transit between emitter 26 and sensor 28. Accordingly, when the fluid level 24 in drip chamber 14 falls below light path 36, the passage of light between emitter 32 and sensor 34 will be as shown by the light path 36 in FIG. 3. It will be understood by the skilled artisan that the present invention will be operable regardless whether visible or invisible light is used. In fact, it may be preferable to use infrared light rather than visible light.

It is recognized that a device incorporating a single photoelectric transducer circuit similar to the one shown in FIG. 3 that comprises an emitter 32 and a sensor 34 is able to provide rough approximations of the presence or absence of fluid. Specifically, since the presence of fluid 22 within container 16 will cause light to be either attenuated or refracted along path 36a at an angle θ from the normal 102 and the absence of fluid 22 will cause light to be refracted along path 36 at an angle α from the normal 102, the variation in light paths may be sufficient to establish the presence or absence of fluid in the container. However, in accordance with circuitry to be subsequently described in detail, light path 36 for the present invention is linearized and normalized with respect to light path 30 to account for physical variables which affect the functioning and reliability of the electrical circuitry between emitters 26 and 32 and their respective sensors 28 and 34. More specifically, in accordance with the present invention, variations due to the materials used for container 16 and changes in temperature are eliminated by referencing the lower photoelectric transducer with the upper photoelectric transducer. This is accomplished electronically by establishing the output of the upper photoelectric transducer 64, established by emitter 26 and sensor 28, as the input to both the upper and the lower photoelectric transducers 64, 84. The lower photoelectric transducer 84 is established by emitter 32 and sensor 34. As will be understood by those skilled in the pertinent art, the use of the output from the upper photoelectric transducer 64 as its own input establishes a controlled feedback loop. Using this same output as input to the lower photoelectric transducer 84 establishes a normalized input for the lower photoelectric transducer. In effect, this establishes an environment for the lower photoelectric transducer which is dependent on conditions sensed by the upper photoelectric transducer 64.

Figure 4:
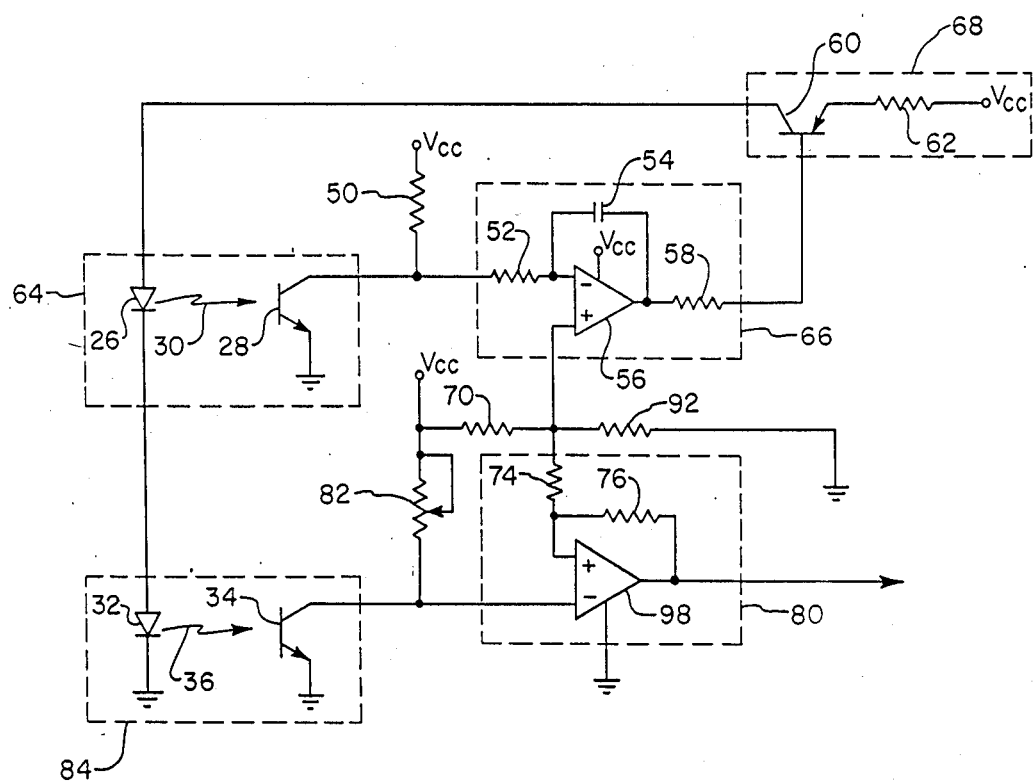
FIG. 4 is a schematic diagram of the circuitry of the detector of FIG. 1.

Referring now to FIG. 4, the electrical circuitry of the present invention is seen in a schematic form. Specifically, it is seen that emitter (diode) 26 and sensor (transistor) 28 are positioned to establish a light path 30. A resistor 50 is connected between the voltage source $V_{cc}$ and transistor 28 to convert the current into the collector of transistor 28 into a voltage. The output of sensor (transistor) 28 is also connected with an amplifier stage 66 which comprises a resistor 52, and operational amplifier 56, a resistor 58 and a capacitor 54 connected as shown in FIG. 4 in a manner well known in the pertinent art. The output from amplifier stage 66 is then connected wtih a current controller 68 which comprises a transistor 60 and a resistor 62. As will be appreciated by those skilled in the pertinent art, photoelectric transducer 64, amplifier stage 66 and current control 68 collectively establish a servo loop. For reasons well known in the pertinent art, current controller 68 is provided in the servo loop as a current amplifier. For this purpose, resistor 62 limits the maximum current amplifier within the servo loop to prevent overdriving emitters 26 and 32. For instance, a blockage of light path 30 in photoelectric transducer 64 will cause excessive current flow. Further, the servo loop will operate at a set point voltage which is established by the system input voltage $V_{cc}$ and the values used for resistor 70 and resistor 72. Since the container 16 is placed in light path 30, it is effectively made part of this circuitry. Thus, the materials used in the manufacture of container 16 affect the value of the current in the servo loop. Likewise, the individual component electrical and electro-optical parameters are affected by the ambient temperature. Consequently, these factors are no longer variables which must be accounted for and the current in the servo loop can be used as a reference signal.

Also known in FIG. 4 is a second photoelectric transducer 84 which is comprised of an emitter (diode) 32, a sensor (transistor) 34 and their associated light path 36. The output from photoelectric transducer 84 is shown in FIG. 4 as an input to the comparator 80 which includes an operational amplifier 78 having positive feedback through a resistor 76. Also shown as part of comparator 80 is a resistor 74. As will be appreciated by those skill in the pertinent art, the value of resistor 76 can be made sufficiently high relative to the value of resistor 74 to provide hysteresis which, by virtue of positive feedback to operational amplifier 78, will sufficiently bias the output of comparator 80 so that variations in the input to comparator 80 which are less than the hysteresis will not affect the output of comparator 80.

A variable resistor 82 is shown in FIG. 4 that is adjustable to establish a margin which is the effective difference between the input to amplifier stage 66 and the input to comparator 80. In accordance with well known servo loop techniques, the input voltage to amplifier stage 66 through resistor 52 is held equal to the reference voltage determined by the values set for resistors 70 and 72. On the other hand, variable resistor 82 will establish the input voltage to comparator 80. And, for reasons to be discussed, a difference in these inputs is generally necessary. Of course, when container 16 is emptied of a clear fluid, it can be expected that current flow through transistor 34 will substantially equal the current flow through transistor 28 since emitters 26 and 32 are in series. However, when an opaque or opalescent fluid is emptied from container 16, a residue may remain on the sides of container 16 which will attenuate, but not refract light path 36. In this latter case, the current flow through transistor 34 will remain less than the current flow through transistor 28 despite the fact that container 16 is empty. Thus, it is necessary that variable resistor 82 be set at a level which allows a lower output voltage from transistor 34 to be handled by detector 10 as substantially equivalent to the higher output voltage of transistor 28. In other words, variable resistor 82 establishes a minimum level above which the output voltage of comparator 80 will alarm the detector 10. As envisioned by the present invention, the output voltage of comparator 80 is a control signal which is continuously compared with the reference signal established in the servo loop. When the control signal output of comparator 80 rises to a predetermined fraction of the reference signal set by the servo loop, the detector 20 alarms to indicate an empty condition for container 16. In other words, when light path 30 and light path 36 are substantially similar and photoelectric transducer 84 is providing an output voltage that is greater than a predetermined fraction of the output voltage of photoelectric transducer 64, an alarm is triggered in detector 10 to indicate an empty container 16.

Figure 5A:
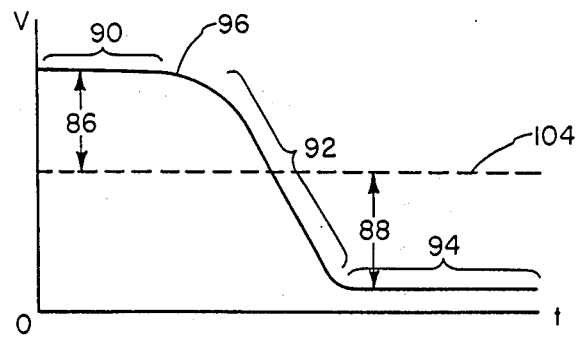
FIG. 5A is a graphical plot of the variation in output voltage of a photoelectric sensor as indicated under certain operating conditions.
Figure 5B:
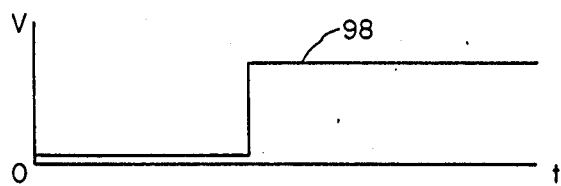
FIG. 5B is a graphical plot of the electrical output of the circuitry shown in FIG. 4 under certain operating conditions.

A further appreciation of the relationship between voltage output of the photoelectric transducer 84 and control signal output from comparator 80 can be had by reference to FIGS. 5A and 5B. Both FIGS. 5A and 5B are graphical plots of voltage with respect to time. More specifically, FIG. 5A is a time representation of the signal voltage change at the collector of transistor 34 as fluid level 24 drops below light path 36. As seen in FIG. 5A, the voltage of sensor (transistor) 34 will be in the region 90 when the fluid level 24 is above the light path 36. As the fluid level 24 recedes across light path 36, the voltage output of sensor (transistor) 34 will vary according to time as shown in the region 92 of FIG. 5A until a voltage corresponding to region 94 is attained when the fluid level 24 is below the light path 36. It will be appreciated that the transition through region 92 will depend in large part on the opalescence of the fluid. Thus, it can be seen in FIG. 5A that for normal operation with fluid level 24 above the light path 36, corresponding to fluid present in the container, a positive interval 86 is established between the operating voltage and a reference voltage indicated by the dashed line 104 in FIG. 5A.

The comparison of FIG. 5A with FIG. 5B shows that the voltage output of comparator 80 represented in FIG. 5B is dependent upon the voltage output of sensor (transistor) 34 shown as the voltage level 96 in FIG. 5A. The control voltage 98 output from comparator 80 is seen to appear as a step-function which changes state according to the voltage level 96 in FIG. 5A. Through appropriate circuitry, the voltage level 98 representing the output from comparator 80 can be used by electronic circuitry well known in the art to trigger an alarm which indicates the absence of fluid in the light path 36. From the foregoing it will be recognized that the absence of fluid in light path 36 corresponds to a condition where fluid 22 has been depleted from drip chamber 14 and which further indicates that the fluid source which is connected in fluid communication with drip chamber 14 has likewise been depleted of fluid.

When detector 10 is used as a combination empty container detector and drop sensor, the output from sensor 28 must be used for two separate signals. On the one hand, as an empty container detector, the output of sensor 28 must be normalized and linearized as previously discussed. For this function, the output of sensor 28 needs to be a relatively steady signal. On the other hand, for the use of detector 10 as a drop sensor the output of sensor 28 must provide a variable and intermittent signal which will correspond to, and permit detection of, fluid drops flowing into container 16.

Figure 7:
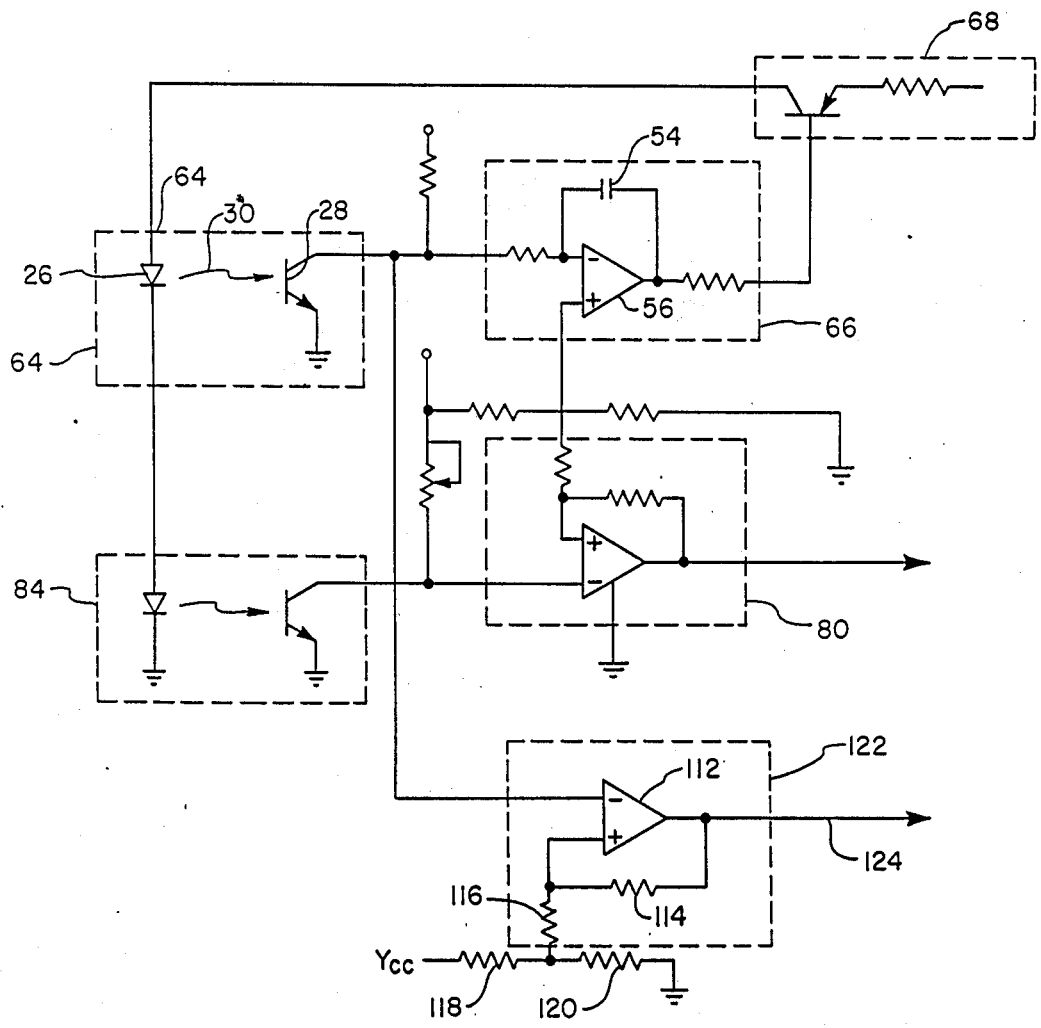
FIG. 7 is a schematic circuit diagram of the electronic componetry of the present invention incorporating a drop sensor.

FIG. 7 shows the electronic circuitry of the detector 10 when it is used both as an empty container detector and a drop sensor. It is to be understood that as drops 110 fall into container 16, in the manner shown in FIG. 1, they will interrupt light path 30. It happens that as the drops 110 interrupt light path 30, the incident light on sensor 28 is modulated and a positive voltage pulse occurs at the collector of sensor 28. Thus, in accordance with drops falling into container 16, the actual output of sensor 28 is variable and intermittent. For purposes to be subsequently discussed this signal is well suited for use by detector 10 in its drop sensing function. Such a signal, however, is inappropriate for use by the detector 10 as an empty container detector. An explanation as to how the output is modified to accomplish both functions requires further reference to FIG. 7.

For the purpose of using detector 10 as an empty container detector, despite the fact that output of sensor 28 is modulated by drops 110 falling through light path 30, the circuitry previously disclosed for amplifier stage 66 is adequate. Specifically, the pulse generated in the output of sensor 28 by drop 110 interrupting light path 30 is integrated by amplifier stage 66 to effect a negligible change in the current flowing from amplifier stage 66 through photoelectric detectors 64 and 84. As is well known by the skilled artisan, this is accomplished by placing capacitor 54 in a feedback loop around operational amplifier 56.

For the purpose of using detector 10 as a drop sensor an additional comparator circuit 122 must be added to the circuitry previously disclosed for detector 10 in FIG. 4. Specifically, comparator 122 requires electrically connecting operational amplifier 112 to the output of sensor 28. Also, electrically connected to operational amplifier 112, in a manner as shown in FIG. 7, are resistors 114 and 116 which provide a hysteresis feedback to amplifier 112. Further, resistors 118 and 120 are connected between the voltage source $V_{cc}$, resistor 116 and ground as shown in FIG. 7 to creat a voltage divider which establishes the threshold for comparator 122. For the purposes of the present invention, an appropriate threshold equals the sum of the DC operating point for sensor 28 and approximately fifty percent (50%) of the pulse amplitude created when a drop 110 interrupts light path 30. Thus, when a drop 110 creates a pulse at sensor 28 the threshold for comparator 122 will be exceeded. This, in turn, creates a negative going logic level signal as the output 124 of comparator 122. As will be appreciated by one skilled in the art, output 124 from comparator 122 can be used as input to electronic components (not shown) which will detect the drops 110, count them, and calculate the rate at which they fall into container 16.

OPERATION

In its operation the empty container detector 10 of the present invention is operatively associated with a drip chamber 14 which has been connected in fluid communication with a fluid source. Upon connection of drip chamber 14 with a fluid source by means of spike 18, the container 16 of drip chamber 14 is squeezed to allow a partial filling of the drip chamber 14 to a fluid level 24 as shown in FIG. 1. It will be appreciated that with drip chamber 14 in fluid communication with a fluid source, the air trapped in drip chamber 14 above fluid 22 will maintain the fluid level 24 substantially as shown in FIG. 1 so long as there is fluid in the fluid source. Thus, it is a purpose of the empty container detector 10 of the present invention to determine when the fluid level 24 falls below a predetermined level in drip chamber 14 and then alarm to indicate the depletion of fluid from the fluid source. Accordingly, the empty container detector 10 comprises a first photoelectric transducer 64 which is operatively associated with the drip chamber 14 and disposed relative to drip chamber 14 above fluid level 24. Also, the empty container detector 10 includes a photoelectric transducer 84 which is associated with drip chamber 14 at a point below fluid level 24 in drip chamber 14.

A reference signal is established by photoelectric transducer 64 and a control signal is established by photoelectric transducer 84. Since photoelectric transducer 64 is disposed above fluid level 24, the reference signal corresponds to air in container 16. On the other hand, transducer 84 is disposed below fluid level 24. By virtue of the refraction of light path 36 in photoelectric transducer 84 in the presence of fluid 22 in drip chamber 14, the photoelectric transducer 84 will have a minimal output. Upon depletion of fluid from the fluid source, the partial vacuum above fluid 22 in drip chamber 14 is relieved and the fluid level 24 recedes through the drip chamber 14. Upon passage of fluid level 24 past the light path 36 of photoelectric transducer 84, the output of photoelectric transducer 84 is changed since light path 36 is no longer refracted or blocked by the presence of fluid in drip chamber 14. Accordingly, the control signal output of comparator 80 is altered. An alarm is triggered to indicate depletion of fluid from the fluid source, i.e., an empty fluid container, when the control signal exceeds a predetermined fraction of the reference signal.

When upper photoelectric transducer 64 is positioned so that drops 110 falling into container 16 interrupt and modulate light path 30, the detector 10 can be used as a drop sensor. In its operation as a drop sensor, the output from photoelectric transducer 64 of detector 10 is modulated by drops 101 interrupting light path 30. This output is integrated by amplifier stage 66 to smooth the modulations before it is used by associated circuitry to accomplish the empty bottle detector function. Additionally, the output from transducer 64 is connected directly to comparator 122. As an input to comparator 122, this output is not integrated by amplifier stage 66. Instead, the modulated signal is connected directly to other electrical componentry to indicate the passage of drops 220 into container 16. The output from comparator 122 can be then connected to appropriate drop sensing components.

While the particular empty container detector as herein shown and disclosed in detail is fully capable of obtaining the objects and providing the advantages herein before stated, it is to be understood that it is merely illustrative of the presently preferred embodiment of the invention and that no limitations are intended to the details of construction or design herein shown other than as defined in the appended claims.

I claim:

1. A fluid level detector with associated drop counter for use with a transparent container which comprises:
   a first photoelectric transducer associated with said container having its light path aimed through said container for operating in a first state when said light path is refracted by a fluid in said container and operating in a second state when said light path is unrefracted by a fluid;
   a second photoelectric transducer associated with said container having its light path aimed through said container to generate a signal for providing a normalized input to said first photoelectric transducer corresponding to no fluid in said container;
   means connected to said second photoelectric transducer to count interruptions of the light path of said second photoelectric transducer; and
   an alarm associated with said second photoelectric transducer to indicate an empty container when said second state is equivalent to a no fluid condition as established by said normalized input.

2. A fluid level detector as recited in claim 1 wherein said second photoelectric transducer is positioned to establish an unrefracted light path through said container above the level of the fluid therein.

3. A fluid level detector as recited in claim 2 wherein said container is a drip chamber which further comprises an input orifice shaped as a drop former to create drops of the fluid entering said container.

4. A fluid level detector as recited in claim 3 wherein said second photoelectric transducer is positioned with its light path intersecting the path of drops falling from said drop former.

5. A fluid level detector as recited in claim 4 wherein said container is cylindrically shaped.

6. A fluid level detector as recited in claim 5 wherein the light path of said second photoelectric transducer is aimed toward and substantially perpendicular to the longitudinal axis of said container.

7. A fluid detector with associated drop counter which comprises:
   a first photoelectric means;
   a second photoelectric means coupled to said first photoelectric means for generating a reference signal for input to said first photoelectric means, said reference signal corresponding to the condition when a fluid does not affect the light path of said second photoelectric means;

means associated with said first photoelectric means for generating a variable control signal, said control signal being in a first state when fluid substantially affects the light path of said first photoelectric means in a second state when fluid does not substantially affect the light path of said first photoelectric means;

means connected to said second photoelectric transducer to count modulated interruptions of said reference signal; and an alarm means associated said first photoelectric means to indicate the absence of fluid when said control signal is a calibrated equivalent of said reference signal.

8. A fluid detector as cited in claim 7 further comprising:

a transparent container; and means for holding a portion of said container in the light path of said first photoelectric means.

9. A fluid detector as cited in claim 8 wherein said holding means holds a portion of said container in the light path of said second photoelectric means.

10. A fluid detector as cited in claim 9 wherein said first and second photoelectric means are operable with invisible light.

11. A fluid level detector as recited in claim 10 wherein said second photoelectric means is positioned to establish an unrefracted light path through said container above the level of the fluid therein.

12. A fluid level detector as recited in claim 11 wherein said container is a drip chamber which further comprises an input orifice shaped as a drop former to create drops of the fluid entering said container.

13. A fluid level detector as recited in claim 12 wherein said second photoelectric means is positioned with its light path intersecting the path of drops falling from said drop former.

14. A fluid level detector as recited in claim 13 wherein said container is cylindrically shaped.

15. A fluid level detector as recited in claim 14 wherein the light path of said second photoelectric means is aimed toward and substantially perpendicular to the longitudinal axis of said container.

16. A method for counting the drops of fluid entering a transparent fluid container and detecting the emptying of the container which comprises the steps of:

A. mounting a first photoelectric means on said container with the light path of said first photoelectric means passing through said container above the fluid level in said container in a position to be interrupted and modulated by said fluid drops for generating a reference signal having a component equivalent to a no-fluid-in-container condition;

B. attaching means to said first photoelectric means for counting modulations of said reference signal;

C. mounting a second photoelectric means on said container to generate a control signal, said control signal being in a first state when fluid substantially affects the light path of said second photoelectric means and in a second state when fluid does not substantially affect the light path of said second photoelectric means;

D. comparing said control signal to said reference signal; and

E. alarming to indicate an empty container condition when said control signal is a calibrated equivalent to a no fluid condition as established by said reference signal.

* * * * *